United States Patent
Vian et al.

(10) Patent No.: US 9,058,036 B1
(45) Date of Patent: Jun. 16, 2015

(54) VEHICLE CAPABILITY MONITORING AND ADAPTATION SYSTEM AND METHOD THEREFOR

(75) Inventors: John L. Vian, Renton, WA (US);
Matthew A. Vavrina, Seattle, WA (US);
Jonathan P. How, Arlington, MA (US);
Joshua Redding, Woburn, MA (US);
Zachary Dydek, Cambridge, MA (US);
Brett Bethke, Arlington, MA (US)

(73) Assignee: THE BOEING COMPANY, Chicago, IL (US)

( * ) Notice: Subject to any disclaimer, the term of this patent is extended or adjusted under 35 U.S.C. 154(b) by 658 days.

(21) Appl. No.: 12/963,095

(22) Filed: Dec. 8, 2010

Related U.S. Application Data

(60) Provisional application No. 61/386,348, filed on Sep. 24, 2010.

(51) Int. Cl.

| | |
|---|---|
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |
| *G05B 23/02* | (2006.01) |
| *G05B 13/04* | (2006.01) |

(52) U.S. Cl.
CPC ........ *G05B 23/0221* (2013.01); *G05B 23/0248* (2013.01); *G05B 13/041* (2013.01); *G05B 23/0283* (2013.01)

(58) Field of Classification Search
CPC ...... G05B 13/00; G05B 13/041; G05B 13/02; G05B 5/01; G05B 23/0221; G05B 23/0224; G05B 23/0283; G05B 23/0248; G01C 23/00

USPC .......... 701/29, 58, 59, 60, 67, 68, 34.3, 34.4, 701/30; 700/28–55; 375/127; 244/194, 195
See application file for complete search history.

(56) References Cited

U.S. PATENT DOCUMENTS

| | | | | |
|---|---|---|---|---|
| 5,838,261 | A | * | 11/1998 | Lauta et al. .................... 340/945 |
| 5,919,267 | A | * | 7/1999 | Urnes et al. ..................... 714/26 |
| 5,987,365 | A | * | 11/1999 | Okamoto ....................... 701/34.3 |
| 6,012,004 | A | * | 1/2000 | Sugano et al. ............... 701/33.6 |
| 6,104,971 | A | * | 8/2000 | Fackler ........................... 701/36 |
| 6,119,058 | A | * | 9/2000 | Anderberg .................... 701/34.3 |
| 6,175,789 | B1 | * | 1/2001 | Beckert et al. ............... 701/29.1 |
| 6,643,569 | B2 | * | 11/2003 | Miller et al. .................. 701/32.9 |
| 6,728,612 | B1 | * | 4/2004 | Carver et al. ................. 701/34.3 |
| 7,020,701 | B1 | * | 3/2006 | Gelvin et al. ................. 709/224 |
| 7,209,814 | B2 | * | 4/2007 | Kipersztok et al. .......... 701/31.6 |

(Continued)

OTHER PUBLICATIONS

Lavretsky, CombinedComposite Model Reference Adaptive Control, Nov. 2009, IEEE.*

(Continued)

*Primary Examiner* — Khoi Tran
*Assistant Examiner* — Rachid Bendidi
(74) *Attorney, Agent, or Firm* — Weiss & Moy, P.C

(57) ABSTRACT

A system for monitoring a vehicle having systems, components, and sensors has a nominal controller and an adaptive controller. A vehicle health function module is coupled to an output of the adaptive controller and generates a vehicle health output signal indicating a prognosis of at least one of the systems or components degradation of the vehicle.

15 Claims, 1 Drawing Sheet

(56) References Cited

U.S. PATENT DOCUMENTS

| | | | |
|---|---|---|---|
| 7,359,775 B2 * | 4/2008 | Strege et al. | 701/31.4 |
| 7,467,034 B2 * | 12/2008 | Breed et al. | 701/29.6 |
| 7,593,793 B2 | 9/2009 | Lavretsky | |
| 7,769,703 B2 * | 8/2010 | Calise et al. | 706/23 |
| 8,079,118 B2 * | 12/2011 | Gelvin et al. | 26/26 |
| 8,082,047 B1 * | 12/2011 | Sharma | 700/54 |
| 8,260,493 B2 * | 9/2012 | Zhang et al. | 701/34.4 |
| 8,295,995 B2 * | 10/2012 | Poisson | 701/3 |
| 8,423,224 B1 * | 4/2013 | Fuciarelli et al. | 701/23 |
| 2004/0078120 A1 * | 4/2004 | Melkers et al. | 701/3 |
| 2006/0027710 A1 * | 2/2006 | Lavretsky et al. | 244/195 |
| 2007/0162161 A1 * | 7/2007 | Kumar | 700/29 |
| 2009/0127400 A1 * | 5/2009 | Lavretsky et al. | 244/195 |
| 2010/0017049 A1 * | 1/2010 | Swearingen et al. | 701/3 |
| 2010/0030716 A1 * | 2/2010 | Calise et al. | 706/23 |
| 2010/0042283 A1 * | 2/2010 | Kell et al. | 701/29 |
| 2010/0052948 A1 * | 3/2010 | Vian et al. | 340/963 |
| 2010/0274416 A1 * | 10/2010 | Poisson | 701/3 |

OTHER PUBLICATIONS

Wilkinson et al., Prognostic and Health Management for Avionics, 2004, IEEE.*

Vichare, Prognostics and health management of electronics, IEEE, 2006.*

Byington, A model-based approach to prognostics and health management for flight control actuators, IEEE, 2004.*

Callan, An Integrated Approach to the Development of an Intelligent Prognostic Health Management System, IEEE, 2006.*

Rui, Realization of multi-agent planning system for autonomous spacecraf, 2005.*

Dydek, Annaswamy and Lavretsky—Adaptive Control of Quadrotor UAVs in the Presence of Actuator Uncertainties American Instituteof Aeronautics and Astronautics—AIAA 2010-3416.

Redding, Dydek, How, Vavrina and Vian—Proactive Planning for Persistent Missions Using Composite Model-Reference Adaptive Control and Approximate Dynamic Programming.

Lavretsky and Sharma—Adaptive Augmentation of Gain-Seheduled Linear Control Laws With Application to the Jdam MK-82 Munition Boeing Report 05H0052.

* cited by examiner

VEHICLE CAPABILITY MONITORING AND ADAPTATION SYSTEM AND METHOD THEREFOR

RELATED APPLICATIONS

The present provisional application is related to U.S. Provisional Patent Application filed Sep. 24, 2010 and having Ser. No. 61/386,348. The present application claims the benefit of the aforementioned.

BACKGROUND

Embodiments of this disclosure relate generally to vehicle capability monitoring and, more particularly, to a system and method that utilizes parameters from an adaptive controller for health monitoring and health-adaptive mission planning, including adapting the operation of a system based on degraded capabilities of vehicles within the system.

Mission success may be based on the ability of vehicles used during the mission to perform up to their capability. In general, the health of each vehicle may be monitored by human operators. This may include visual inspection of the vehicle, monitoring of operating sensors located on the vehicle, and the like. Unfortunately, the capability of a vehicle may not be easily determined by human operators. For example, not all components on the vehicle may be accessible to human observation. Further, not all components on the vehicle may have sensors to monitor the condition of the component. Additionally, new adaptive methods can mask reduced control margins as vehicles degrade or become damaged. Because the vehicle health and capability is not easily determined, nor provided in advance of actual degradation, it is not possible to automatically adapt vehicle operations to retain a high level mission assurance.

Therefore, it would be desirable to provide a system and method that overcomes the above.

SUMMARY

A system for monitoring a vehicle having systems, components, and sensors has a nominal controller and an adaptive controller. A vehicle health function module is coupled to an output of the adaptive controller and generates a vehicle health output signal indicating a prognosis of at least one of the systems or components degradation of the vehicle.

A system for monitoring a vehicle having systems, components, and sensors has a nominal controller which generates a nominal control output signal in response to a control command signal. An adaptive controller receives the control command signal and a vehicle state signal and generates an adaptive control output signal indicating deviations from nominal efficiency of the at least one of the systems or components of the vehicle to the vehicle health function module. A vehicle health function module receives the adaptive control output signal and generates a vehicle health output signal indicating a prognosis of at least one of the systems or components degradation of the vehicle.

A method for determining if a vehicle may perform a mission task comprising: monitoring at least one system or component of the vehicle; assessing degradation of at least one of a system or component of the vehicle; and assessing capability of the vehicle to perform the mission task.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Vehicles may be designed with adaptive control systems. Adaptive control systems may be automated systems and or processes that may use adaptation as part of a prediction of process behavior in order to optimize control of the vehicle. Adaptation may be a process of performing computations on a set of measured or presented data from the vehicle to develop a parametric model that best fits the observed data according to some error criterion. For example, in an unmanned aircraft, the mass of the unmanned aircraft will decrease over time due to fuel consumption. Thus, an adaptive control system may be used to fly the unmanned aircraft that may use the weight of the unmanned aircraft and control laws to adapt itself to the changing conditions.

Figure 1:
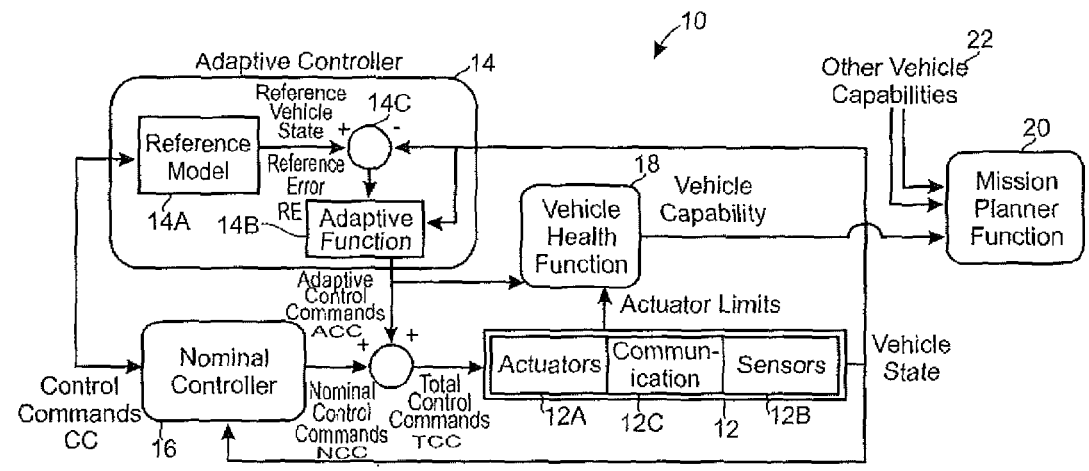
FIG. 1 is a block diagram of the system.

Referring to FIG. 1, a health monitoring and adaptive mission planning system 10 (hereinafter system 10) is shown. The system 10 may be used for health monitoring of a vehicle employing the system 10 and for health adaptive planning of missions involving the vehicle. This may include adapting the operation of a vehicle system based on degraded capabilities of the vehicles in order to complete a desired mission. The system 10 may allocate different assets, assign task, and determine guidance, navigation and control commands to the vehicle based on the capability of the vehicle (vehicle health) as determined by the system 10.

The system 10 may have one or more vehicles 12. Each vehicle 12 may be comprised of one or more systems and or subsystems which have actuators 12A, sensors 12B, and the like. The actuators 12A may be used to control the operation of the vehicle 12. The sensors 12B may be used to measure the current operational state of different components of the vehicle 12.

The system 10 may have an adaptive controller 14, a nominal controller 16, a vehicle health module 18, and a mission planning module 20. In accordance with the embodiment shown in FIG. 1, the adaptive controller 14 may have a reference model 14A, an adaptive function module 14B and a summation unit 14C.

In operation, a control command signal CC may be provided to the nominal controller 16 and the adaptive controller 14. The control command CC may be provided by an operator of the vehicle 12, preprogrammed into the vehicle 12, provided to the vehicle 12 by an external source, or the like. The listing of the above is given as an example and should not be seen in a limiting manner.

In response to the control command signal CC, the nominal controller 16 may generate an output signal NCC. The output signal NCC of the nominal controller 16 may be combined with an output signal ACC of the adaptive controller 14 to form a total control command signal TCC. The total control command signal TCC may then be sent to the vehicle 12.

The vehicle 12, in response to the total control command signal TCC may execute the total control command signal TCC. For example, if the total control command signal TCC was a command for the vehicle 12 to climb of a certain number of feet per second, the vehicle 12 may use a set of actuators 12B that operate control surfaces on the vehicle 12.

In response to the actuation of the control surfaces, the vehicle 12 may possess a certain state as measured by sensors 12B, denoted as vehicle state signal VS. The vehicle state signal VS may further be sent to the adaptive controller 12 for the vehicle 10.

The reference model 14A of the adaptive controller 14 may receive the control command CC and generates a reference vehicle state RVS for the vehicle aircraft 12 that would be expected in response to the control command CC received. A summation device 14C of the adaptive controller 14 may receive the vehicle state VS and generates a reference error RE signal representing the difference between reference vehicle state RVS and the vehicle state VS. The adaptive function module 14B may take the reference error RE signal and formulate an adaptive control command signal ACC. The adaptive control command signal ACC may be combined with the output signal NCC of the nominal controller 16 to form a total control command signal TCC. The total control command signal TCC may then be sent to the vehicle 12.

Thus, if the vehicle 12 is operating under predefined operating parameters, the control command signal CC may be sent through to the vehicle 12 via the nominal controller 16 basically unaltered. However, should the summation device 14C of the adaptive controller 14 generate a reference error signal RE representing the difference between reference vehicle state RVS and the vehicle state VS, the adaptive function module 14B may take the reference error RE signal and formulate an adaptive control command signal ACC. The adaptive control command signal ACC may be combined with the output signal NCC of the nominal controller 16 to form a total control command signal TCC. The total control command signal TCC may then be sent to the vehicle 12.

The system 10 may further have a vehicle health assessment module 18. The vehicle health assessment module 18 may be coupled to the adaptive controller 14 and the vehicle 12. The vehicle health assessment module 18 may take readings from the sensors 12B and the like. Parameters from the adaptive controller 14 may be used by the vehicle health assessment module 18 as a means to monitor the health of the vehicle 12 and or different systems, subsystems, component parts, and the like of the vehicle 12. The parameters from the adaptive controller 14 may be used to indicate deviations from nominal efficiency. Since the parameters of the adaptive controller 14 may be constantly updated as the adaptive controller 14 is operated, variations may be interpreted as real-time health data. The vehicle health assessment module 18 may then utilize this health information for several purposes.

One application of the health information gathered from the adaptive controller 14 may be for Integrated Vehicle Health Management (IVHM). The vehicle health function module 18 may use the data from the adaptive controller 14 and the vehicle sensors 12B for the diagnosis and the prognosis of different subsystems, component failure, or degradation within the vehicle 12. In this context, the data from the adaptive controller 14 may be employed for estimating the severity of a component failure or determining the remaining useful life of a component within the vehicle 12.

The data from the adaptive controller 14 may further be used to determine the capability of an actuator, subsystem, or the like of the vehicle 12 on-line by the vehicle health function module 18. In accordance with one embodiment, the vehicle health module 18 may be coupled to a communication system 12D of the vehicle 12. This may allow for the online access. This capability assessment, may allow for real-time, critical decision making in an autonomous vehicle. For example, if the vehicle 12 is an aerial vehicle, the capability assessment by the vehicle health function module 18, could trigger a 'land now' action if the vehicle health function module 18 determines that the vehicle 12 is no longer capable of flying reliability.

The system 10 may further have a mission planning module 20. The mission planning module 20 may be coupled to the vehicle health function module 18. The mission planning module 20 may use the health information of different vehicles 12 obtained by the vehicle health function modules 18 of each vehicle 12 to aid in mission planning of autonomous, multi-vehicle systems 22.

As illustrated in FIG. 1, the vehicle health function module 18 may determines a capability of each vehicle 12 based on the parameters of the adaptive controller 14 and then pass the capability assessment to the mission planning module 20. In turn, the mission planning module 20 accounts for the capability of the vehicle 12 when allocating resources and assigning tasks to the assets in the multi-vehicle system 22. In this way, the mission planning module 20 utilizes the capability assessment of a vehicle 12 for either reactive or proactive mission-level decisions to improve mission performance.

As an example, the multi-vehicle system 22 may comprises a plurality of vehicles 12 which may be Unmanned Aerial Vehicles (UAVs). The multi-vehicle system 22 may have a task of monitoring a particular boarder area. The vehicle health function module 18 of each vehicle 12 may determine a capability of each vehicle 12 based on the parameters of the adaptive controller 14 and then may pass the capability assessment to the mission planning module 20. In turn, the mission planning module 20 may account for the capability of the vehicle 12 when allocating resources and assigning tasks to the assets in the multi-vehicle system 22. For example, if one of the vehicles 12 is suffering from damage, the health function module 18 may determine a capability of the damaged vehicle 12 based on the parameters of the adaptive controller 14. This information may then be forwarded to the mission planning module 20 to determine if the damage vehicle 12 may complete the task or if a new vehicle 12 may be required.

Figure 2:
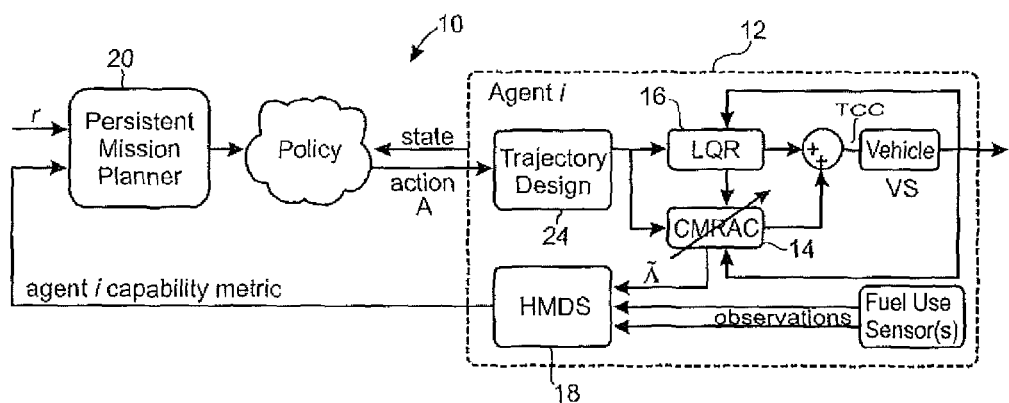
FIG. 2 is a block diagram of the system.

Referring now to FIG. 2, a block diagram of the system 10 showing one embodiment of an adaptive controller and nominal controller is shown. In this embodiment, the system 10 has a mission planning module 20. The mission planning module 20 may output a command to each vehicle 12. The command may require some type of action signal A to be sent to the vehicle 12. For example, the action signal A may be for the vehicle to advance to next part of a mission, go back to base to refuel or to land due to damage, etc. The above types of action signals A is given as an example and should not be seen in a limiting manner.

The action signal A may be sent to the vehicle 12. The action signal A may be sent to a controller 24. The controller 24 may be used to determine the course of action. For example, if the vehicle 12 s a UAV, an action signal A may be sent to the controller 24 to return to base. The controller 24 may then send signals to the nominal controller 16 to implement the action signal. Thus, in the above example, the controller 24 may send guidance signals to the vehicle so that the vehicle 12 may return to base. The nominal controller 16 may then send signals to the actuators 12B so that the vehicle 12 may return to base. In the embodiment shown in FIG. 2, the nominal controller 16 may be a Linear Quadratic Regulator (LQR).

The controller 24 may send signals to the adaptive controller 14 as well. In the embodiment shown in FIG. 2, the adaptive controller 14 may be a Composite Model Reference Adaptive Controller (CMRAC). If the vehicle 12 is operating under predefined operating parameters, the signal from the controller 24 may be by the vehicle 12 via the nominal controller 16 basically unaltered. However, should the summation device 14C of the adaptive controller 14 generate a reference error signal RE representing the difference between reference vehicle state and the vehicle state VS. The adaptive controller 14 may be used to formulate an adaptive control command signal ACC. The adaptive control command signal ACC may be combined with the output of the nominal controller 16 to form a total control command signal TCC. The total control command signal TCC may then be used by the vehicle 12.

Parameters from adaptive controller 14 may be used to provide a measure of the health of the vehicle 12. This information may then be sent to the mission planning module 20 for proactive mission planning using an approximate dynamic programming (ADP) algorithm. Parameters internal to the adaptive controller 14 provide insight into the physical capabilities of the vehicle 12 and are used in conjunctions with information from fuel and other vehicle sensors 12B to form a picture of overall agent capability in a multi-vehicle mission.

The combined metric may be used to enable both reactive and proactive behaviors against degradations of different systems, subsystems, and the like within the vehicle 12. Below is one example of a specific mission planner. However, many different types of mission planners are possible. In this embodiment the persistent mission is formulated as a Markov decision process and an approximate solution is implemented using an ADP technique called Bellman Residual Elimination (BRE). In this example, an online solution approach is adopted, where the stochastic fuel, sensor and actuator health models of each agent are adapted in real-time and are used each time the planner re-computes the control policy.

A mission plan within the mission planning module 20 may be specified by (S, A, P, g), where S is the state space, A is the action space, $P_{ij}(u)$ gives the transition probability from state i to state j under action u, and g(i, u) gives the cost of taking action u in state i. It is assumed that the mission plan is known and is a function of the agent health metric mentioned above. Future costs are discounted by a factor $0<\alpha<1$. A policy of the mission planning module 20 is denoted by $\mu$: S→A. Given the mission planning module 20 specification, it may be desirable to minimize the cost-to-go function $J_\mu$ over the set of admissible policies $\pi$.

$$\min J_\mu(i_0) = \min E\left[\sum_{k=0}^{\infty} \alpha^k g(i_k, \mu(i_k))\right].$$

The cost-to-go for a fixed policy $\mu$ satisfies the Bellman equation:

$$J_\mu(i) = g_i^\mu + \alpha \sum_{j \in S} P_{ij}^\mu J_\mu(j) \; \forall \; i \in S,$$

where $\tilde{J}_\mu$ is an approximation to the true cost function $J_\mu$ and $\tilde{S}_\mu \subset S$ is a set of representative sample states. BRE uses a flexible kernel-based cost approximation architecture to construct $\tilde{J}_\mu$ such that the objective function is identically zero. As implemented, the BRE solver runs continuously, being updated with agent states in real-time and queried for a policy as needed.

To enable a health assessment at the agent level, the variations in the control gains of a composite model-reference adaptive controller may act as indicators of potential health issues with the vehicle. In accordance with one example, the linearized dynamics may be written as:

$$\dot{x}_p = A_p x_p + B_p \Lambda(u + \theta^T \omega),$$

where $B_p$ is constant and known, $A_p$ is constant and unknown, $\Lambda$ is an unknown diagonal positive definite constant matrix with diagonal elements $\Re \in (0,1]$ representing actuator uncertainty, $\theta$ is an unknown matched parameter uncertainty, and $\omega^T = \lfloor x_p^T r^T 1 \rfloor$ is the regressor vector. The goal is to track a reference command r in the presence of the unknown $A_p$, $\Lambda$ and $\theta$.

The system output may be defined as:

$$y_p = C_p x_p$$

The output tracking error may be defined as:

$$e_y = y_p x - r$$

The integrated output tracking error may be defined as:

$$\dot{e}_{yI} = e_y$$

This leads to the extended open loop dynamics:

$$\dot{x}_t = A_t x_t + B_t \Lambda(u + \theta^T \omega) + B_c r$$

where $x_t = [x_p^T e_{yI}^T]^T$ is the extended system state vector. The extended open-loop system matrices are then $$A_t = \begin{bmatrix} A_p & 0 \\ C_p & 0 \end{bmatrix}, B_t = \begin{bmatrix} B_p \\ 0 \end{bmatrix}, B_c = \begin{bmatrix} 0 \\ -I \end{bmatrix}$$

A nominal controller $$u_{nom} = K_x x_t$$

May be designed for the extended system, where there is no uncertainty, that is $\Lambda = I^{n \times n}$. The feedback gains can be selected using Linear Quadratic Regulator (LQR) or classical design techniques. The reference model used by the adaptive controller is then closed loop with system with no uncertainty $$\dot{x}_m = A_t x_m + B_t u_{nom} + B_c r = A_m x_m + B_c r.$$

A direct adaptive control input is added to the baseline controller as $$u_{ad} = \hat{K}_x^T x_t + \hat{\theta}_r^T r + \hat{\theta}_d = \hat{\theta}^T \omega,$$

where $\hat{\theta}^T = \lfloor \hat{K}_x^T \; \hat{\theta}_r^T \; \hat{\theta}_d^T \rfloor$ are time-varying adaptive parameters that will be adjusted in the adaptive law given below. The overall control input is thus $$u = u_{ad} + u_{nom} = \hat{\theta}^T \omega + K_x x_t + r.$$

The canonical direct adaptive law is given by $$\dot{\hat{\theta}} = -\Gamma \omega e^T P B_T,$$

Where $\Gamma$ is a diagonal positive definite matrix of adaptive gains, $e = x_t - x_m$ is the model tracking error, and P is the unique symmetric positive definite solution of the Lyapunov equation $$A_m^T P + P A_m = -Q$$

Where Q is positive definite. In the nominal case, with no parameter uncertainty, the overall system is equivalent to the baseline controller. However, when failures or other uncertainties arise, the adaptive controller works to assist the baseline controller in maintaining stability and performance.

Aspects of indirect adaptive control are combined with the adaptive controller described above for a combined model-reference adaptive controller. The dynamics of the open-loop system are rewritten as $$\dot{x}_t + \lambda_f x_t = \lambda_f x_t + A_m x + B_c r + B\Lambda(u + \theta^T \omega)$$

and a stable filter is introduced $$G(s) = \lambda_f/(s + \lambda_f)$$

where $\lambda_f > 0$ is the filter inverse constant. The filtered version of $x_t$ is denoted $x_{tf}$ is described by the dynamics $$\dot{x}_{tf} + \lambda_f x_{tf} = \lambda_f x_t$$

Letting $z = x_t - x_{tf}$ leads to $$\dot{z} + \lambda_f z = A_m x_t + B_c r + B\Lambda(u + \theta^T \omega)$$

and, consequently $$z = z(t_0)e^{-\lambda_f(t-\eta)} + \int_0^t e^{-\lambda_f(t-\eta)}[A_m x_t(\eta) + B_c r(\eta) + B\Lambda(u(\eta) + \theta^T \omega(\eta))]d\eta.$$

Assuming the filter dynamics and plant dynamics have the initial conditions, that is $z(t_0) = 0$ gives $$x_t - x_{tf} = A_m \frac{x_{tf}}{\lambda_f} + B_c \frac{r_f}{\lambda_f} + \Lambda \frac{u_f}{\lambda_f} + \Lambda \theta^T \frac{\omega_f}{\lambda_f}$$

where $r_f$, $u_f$, and $\omega_f$ are filtered versions of r, u, and $\omega$, respectively. Additionally, assuming B is full rank the equation can be rearranged as $$(B^T B)^{-1} B^T (\lambda_f (x_t - x_{tf}) - A_m x_{tf} - B_c r_f) = \Lambda u_f + \Lambda \theta^T \omega_f$$

where the left-hand side of the equation can be computed online at every time instant using the state $x_t$, the filtered state $x_{tf}$ and the command input r. The right-hand side contains the unknown parameters $\Lambda$ and $\theta$, which can be estimated using the predictor model:

$$\hat{Y} = \hat{\Lambda}(u_f + \hat{\theta}^T \omega_f).$$

The predictor error $e_Y = \hat{Y} - Y$ can thus be written as $$e_Y = \Lambda \tilde{\theta} \omega_f + \tilde{\Lambda}(u_f + \hat{\theta}^T \omega_f).$$

Including the indirect adaptation is accomplished by adding indirect adaptive terms to the direct adaptive laws $$\dot{\hat{\Lambda}} = -\Gamma_\Lambda (u + \hat{\theta}^T \omega_f) e_Y^T$$

$$\dot{\hat{\theta}} = \Gamma_\theta (\omega e^T P B - \omega_f \eta_c e_Y^T)$$

In addition to the parameter estimates $\hat{\theta}$, the CMRAC approach also explicitly generates estimates of $\hat{\Lambda}$. The diagonal elements of $\Lambda$ provide estimates of the current health of the vehicle's actuators, specifically indicating the deviation from nominal efficiency for each actuator. These parameters are then handed to the onboard HMDS for generation of a capability metric.

While embodiments of the disclosure have been described in terms of various specific embodiments, those skilled in the art will recognize that the embodiments of the disclosure can be practiced with modifications within the spirit and scope of the claims.

What is claimed is:

1. A system for monitoring a vehicle having systems, components, and sensors comprising:
   a nominal controller;
   an adaptive controller;
   a vehicle health function module coupled to sensors on the vehicle and to an output of the adaptive controller, wherein the sensors provide current operating conditions of at least one of the systems or components of the vehicle and the output of the adaptive controller indicating current derivations form predefined operating parameters of at least one of the systems or components of the vehicle, the vehicle health function module generating a real time vehicle health output signal indicating current operational longevity of at least one of the systems or components of the vehicle; and
   a mission planning module coupled to the vehicle health function module to determine a capability of the vehicle to complete an assigned task based on the real time vehicle health output signal generated by the vehicle health function module and configured to allocate resources on a proactive basis based on the real time vehicle health output signal indicating current operational longevity of at least one of the systems or components of the vehicle and on a reactive basis based on the current operating conditions to complete the assigned task.

2. The system of claim 1, wherein the current operational longevity of the at least one of the systems or components of the vehicle is wirelessly communicated using a communication system of the vehicle.

3. The system of claim 1, wherein the mission planning module is coupled to outputs of a plurality of vehicle health function modules to determine a capability of each vehicle to complete an assigned task.

4. The system of claim 1, wherein the adaptive controller comprises:
   a reference model module; and
   an adaptive function module coupled to an output of the reference model module and to the vehicle.

5. The system of claim 1, wherein the adaptive controller is a Composite Model-Reference Adaptive Control (CMRAC).

6. The system of claim 1, wherein the nominal controller is a Linear Quadratic Regulator (LQR).

7. The system of claim 1, wherein the vehicle health function module estimates a severity of failure of at least one of the systems or components of the vehicle.

8. A system for monitoring a vehicle having systems, components, and sensors comprising:
   a nominal controller which generates a nominal control output signal in response to a control command signal;
   an adaptive controller which receives the control command signal and a vehicle state signal and generates an adaptive control output signal indicating deviations from nominal efficiency of the at least one of the systems or components of the vehicle to the vehicle health function module; and
   a vehicle health function module which receives the adaptive control output signal, the adaptive control output signal indicating derivations form predefined operating parameters of the at least one of the systems or components of the vehicle, the vehicle health function module generating a vehicle health output signal indicating a current operational longevity of the at least one of the systems or components of the vehicle; and
   a mission planning module coupled to the vehicle health function module to determine a capability of the vehicle to complete an assigned task based on an output of the vehicle health function module and configured to allocate one or more additional vehicles on a proactive basis based on the current operational longevity of at least one of the systems or components of the vehicle and on a reactive basis based on the current operating conditions of the vehicle to complete the assigned task.

9. The system of claim 8, wherein the current operational longevity of the at least one of the systems or components degradation of the vehicle is wirelessly communicated using a communication system of the vehicle.

10. The system of claim 8, wherein the mission planning module is coupled to outputs of a plurality of vehicle health function modules to determine a capability of each vehicle to complete an assigned task in a multi-vehicle mission.

11. The system of claim 8, wherein the adaptive controller comprises:
   a reference model module; and
   an adaptive function module coupled to an output of the reference model module and to the vehicle.

12. The system of claim 8, wherein the adaptive controller is a Composite Model-Reference Adaptive Control (CM-RAC).

13. The system of claim 8, wherein the nominal controller is a Linear Quadratic Regulator (LQR).

14. A method for determining when a vehicle may perform a mission task comprising:
   monitoring at least one of a system or component of the vehicle by a vehicle health function module, the vehicle health function module receiving current operating readings from at least one sensor on the at least one of a system or component of the vehicle and an adaptive control output signal indicating deviations from nominal efficiency of the at least one of the systems or components of the vehicle;
   assessing current operational longevity of the at least one of a system or component of the vehicle by the vehicle health function module;
   assessing capability of the vehicle to perform the mission task by a mission planning module, wherein the mission planning module determines capability of the vehicle based on readings from the vehicle health function module;
   allocating resources on a proactive basis based on the current operational longevity of at least one the systems or components of the vehicle and on a reactive basis based on the current operating conditions of the vehicle to complete the assigned task.

15. The method of claim 14, further comprising allocating additional resources by the mission planning module when the current operational longevity indicates that the vehicle is not capable to perform the mission task.

\* \* \* \* \*